(12) United States Patent
Varadharajan et al.

(10) Patent No.: US 10,496,321 B2
(45) Date of Patent: *Dec. 3, 2019

(54) FILTERED REFERENCE COPY OF SECONDARY STORAGE DATA IN A DATA STORAGE SYSTEM

(71) Applicant: Commvault Systems, Inc., Tinton Falls, NJ (US)

(72) Inventors: Prakash Varadharajan, Manalapan, NJ (US); Manas Bhikchand Mutha, Ocean, NJ (US); Vinit Dilip Dhatrak, Ocean, NJ (US); Pavan Kumar Reddy Bedadala, Piscataway, NJ (US); Hetal Kapadia, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 347 days.

This patent is subject to a terminal disclaimer.

(21) Appl. No.: 15/193,698

(22) Filed: Jun. 27, 2016

(65) Prior Publication Data

US 2016/0306558 A1 Oct. 20, 2016

Related U.S. Application Data

(63) Continuation of application No. 13/791,043, filed on Mar. 8, 2013, now Pat. No. 9,405,482.

(Continued)

(51) Int. Cl.
*G06F 7/00* (2006.01)
*G06F 17/30* (2006.01)
(Continued)

(52) U.S. Cl.
CPC .............. *G06F 3/065* (2013.01); *G06F 3/067* (2013.01); *G06F 3/0619* (2013.01);
(Continued)

(58) Field of Classification Search
CPC ...... G06F 3/065; G06F 3/0643; G06F 3/0619; G06F 3/067; G06F 11/00; G06F 17/30082; G06F 16/122
See application file for complete search history.

(56) References Cited

U.S. PATENT DOCUMENTS 5,204,958 A * 4/1993 Cheng ................. G06F 16/9027
6,460,055 B1 10/2002 Midgley et al.
(Continued)

FOREIGN PATENT DOCUMENTS

| JP | 2005-243013 A | 9/2005 |
|---|---|---|
| WO | WO 2010/036754 A1 | 4/2010 |
| WO | WO 2014/099679 | 6/2014 |

OTHER PUBLICATIONS

International Search Report and Written Opinion in PCT/US2013/029407 dated Jun. 24, 2013.
(Continued)

*Primary Examiner* — Hasanul Mobin
(74) *Attorney, Agent, or Firm* — Knobbe Martens Olson & Bear LLP

(57) ABSTRACT

The data storage system according to certain aspects can filter secondary copies of data (e.g., backups, snapshots, archives, etc.) generated by multiple client computing devices into a single, filtered, global reference copy. A reference copy may be a filtered view or representation of secondary storage data in a data storage system. A reference copy may include a data structure that includes references to a subset of secondary storage data that meets certain filtering criteria. The filtering criteria may be specified by users according to user preference. Data included in a reference copy may be stored in native format (e.g., format of the application that generated the data) and be accessible through the application associated with the data.

20 Claims, 9 Drawing Sheets

Related U.S. Application Data

(60) Provisional application No. 61/745,208, filed on Dec. 21, 2012.

(51) Int. Cl.
  *G06F 3/06* (2006.01)
  *G06F 11/00* (2006.01)
  *G06F 16/11* (2019.01)

(52) U.S. Cl.
  CPC ............ *G06F 3/0643* (2013.01); *G06F 11/00* (2013.01); *G06F 16/122* (2019.01)

(56) References Cited

U.S. PATENT DOCUMENTS

| | | | |
|---|---|---|---|
| 7,376,062 B2 | 5/2008 | Hsu et al. | |
| 7,389,311 B1* | 6/2008 | Crescenti | G06F 11/1461 |
| 7,523,149 B1 | 4/2009 | Sridharan et al. | |
| 7,594,082 B1 | 9/2009 | Kilday et al. | |
| 7,680,830 B1 | 3/2010 | Ohr et al. | |
| 7,769,722 B1 | 8/2010 | Bergant et al. | |
| 7,773,724 B2* | 8/2010 | Harding | G01V 5/0025 378/71 |
| 7,809,868 B1* | 10/2010 | Mu | G06F 3/0604 709/230 |
| 7,877,362 B2 | 1/2011 | Gokhale et al. | |
| 7,882,077 B2 | 2/2011 | Gokhale et al. | |
| 8,335,768 B1 | 12/2012 | Desai et al. | |
| 8,510,331 B1 | 8/2013 | Zoellner et al. | |
| 8,527,468 B1 | 9/2013 | Crafford et al. | |
| 8,600,935 B1* | 12/2013 | Dantkale | G06F 11/1451 707/624 |
| 8,799,245 B2 | 8/2014 | Amarendran et al. | |
| 8,838,624 B2 | 9/2014 | Crump et al. | |
| 8,856,081 B1 | 10/2014 | Chaudhari et al. | |
| 8,924,355 B1* | 12/2014 | Kundzich | G06F 11/1448 707/647 |
| 9,262,449 B2 | 2/2016 | Amarendran et al. | |
| 9,405,482 B2 | 8/2016 | Varadharajan et al. | |
| 2001/0001870 A1 | 5/2001 | Ofek et al. | |
| 2002/0049747 A1* | 4/2002 | Inohara | G06F 16/256 |
| 2003/0005228 A1* | 1/2003 | Wong | G06F 12/0811 711/121 |
| 2005/0171979 A1 | 8/2005 | Stager et al. | |
| 2005/0246386 A1 | 11/2005 | Sullivan et al. | |
| 2006/0064555 A1 | 3/2006 | Prahlad et al. | |
| 2006/0085666 A1* | 4/2006 | Stakutis | G06F 11/1417 714/2 |
| 2006/0101084 A1 | 5/2006 | Kishi et al. | |
| 2006/0156382 A1 | 7/2006 | Motoyama | |
| 2006/0256768 A1* | 11/2006 | Chan | H04L 1/08 709/238 |
| 2007/0143371 A1* | 6/2007 | Kottomtharayil | G06F 3/0619 |
| 2007/0179995 A1 | 8/2007 | Prahlad et al. | |
| 2007/0203938 A1 | 8/2007 | Prahlad et al. | |
| 2007/0208788 A1 | 9/2007 | Chakravarty et al. | |
| 2007/0255770 A1 | 11/2007 | Murase | |
| 2007/0260640 A1 | 11/2007 | Hamilton et al. | |
| 2008/0228785 A1 | 9/2008 | Kavuri et al. | |
| 2008/0244177 A1 | 10/2008 | Crescenti et al. | |
| 2008/0250204 A1 | 10/2008 | Kavuri et al. | |
| 2009/0125577 A1 | 5/2009 | Kodama et al. | |
| 2009/0164530 A1 | 6/2009 | Gilpin et al. | |
| 2009/0307448 A1 | 12/2009 | Gokhale et al. | |
| 2010/0005151 A1 | 1/2010 | Gokhale | |
| 2010/0094809 A1 | 4/2010 | Consul et al. | |
| 2010/0250549 A1 | 9/2010 | Muller et al. | |
| 2010/0332454 A1 | 12/2010 | Prahlad et al. | |
| 2010/0332479 A1 | 12/2010 | Prahlad et al. | |
| 2010/0332561 A1 | 12/2010 | Prahlad et al. | |
| 2011/0113466 A1* | 5/2011 | Stringham | G06F 21/6227 726/1 |
| 2012/0030171 A1 | 2/2012 | Kottomtharayil | |
| 2012/0271832 A1 | 10/2012 | Prahlad et al. | |
| 2013/0067163 A1* | 3/2013 | Velayudhan | G06F 13/12 711/114 |
| 2013/0238563 A1 | 9/2013 | Amarendran et al. | |
| 2014/0019454 A1 | 1/2014 | Carter et al. | |
| 2014/0181048 A1 | 6/2014 | Varadharajan et al. | |
| 2014/0181438 A1 | 6/2014 | Varadharajan et al. | |

OTHER PUBLICATIONS

International Preliminary Report on Patentability in PCT/US2013/029407 dated Sep. 9, 2014.

International Search Report and Written Opinion in PCT/US2013/075154 dated Mar. 24, 2014.

International Preliminary Report on Patentability in PCT/US2013/075154 dated Jun. 23, 2015.

* cited by examiner

FILTERED REFERENCE COPY OF SECONDARY STORAGE DATA IN A DATA STORAGE SYSTEM

INCORPORATION BY REFERENCE TO ANY PRIORITY APPLICATIONS

Any and all applications for which a foreign or domestic priority claim is identified in the Application Data Sheet, or any correction thereto, are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

Data that has a logical relationship to each other, such as data generated by a single production client machine or by a single application, data associated with a particular user, data having common content or metadata, etc., may be stored across different storage devices. In addition, related files or data are often dispersed amongst large amounts of other, unrelated files. Because backups and other secondary copies are often accessed across relatively slower network connections than primary copies and/or reside on relatively slower storage media, accessing, processing and protecting backup copies can be time consuming and resource intensive.

Due to the above challenges, it can be important to provide efficient, user-friendly tools for facilitating effective retention policies and for providing access to backup data. Systems and methods are provided herein that create a filtered version of backup data (or other secondary copy data). In some embodiments, the filtered version provides a digestible, global view or copy of a subset of the secondary copy data, such as data that is stored across multiple secondary storage devices. A data storage system according to certain aspects can filter secondary copies of data (e.g., backups, snapshots, archives, etc.) generated by multiple client computing devices into a single, filtered, global reference copy. The term "reference copy" may refer to a filtered view or representation of secondary storage data in a data storage system. A reference copy may include references (e.g., pointers) to a subset of secondary storage data that meets filtering criteria. In some other embodiments, the reference copy includes actual copies of the files or other data stored in secondary storage that meet the filtering criteria. In yet further instances, the reference copy includes references to some of the files in the reference copy, and includes actual copies of other files, such as where the reference copy includes de-duplicated (e.g., single-instanced) data. Such filtering criteria may be specified by a user according to what the user wants to include in the reference copy.

A user may specify reference copy rules that include filtering criteria for filtering the data. For instance, according to the filtering criteria, the data storage system according to certain aspects can filter data items based on content, metadata, or any other appropriate characteristic of the data. The criteria for filtering can be defined according to user preference. For example, the user may wish to filter files based on content using search terms and/or based on metadata. Files can be filtered based on subject matter (e.g., as indicated by content and/or metadata), for example, some other appropriate parameter associated with the files, or any combination thereof. Emails, for instance, may be filtered according to subject line content, sender, recipient, message body content, presence, or type of attachment(s), etc. The reference copy rules may be implemented as storage policies.

The reference copy rules may run, for example, according to a schedule, based on a particular event, user request, etc. For instance, the reference copy rules may run after a scheduled (e.g., hourly, daily, weekly, etc.) backup completes. Media agents in the system conduct data to and from the storage devices, and media agents may be instructed to search and identify data that meets the filtering criteria. Each media agent may search and identify data in the storage devices associated with it. Each media agent may also search and identify data of a particular type, or data associated with a particular client computing device or group thereof. For example, one media agent may be associated with Exchange data, another media agent may be associated with PDF data, etc. By using media agents to search the data, the system can distribute the workload for reference copy generation across the system and provide scalability in implementing reference copies.

The data storage system according to certain aspects can create or update a reference copy based on the data identified by the media agents. The reference copy can include references to the identified data. The references may include pointers to the files (or other data items) that were identified according to the filtering criteria, rather than copies of the actual files themselves. In some cases, the references may also include actual copies of files themselves. The reference copy can include information relating to the identified data, such as source client, source device, source application, etc. Such information may be embedded in the reference copy. In some embodiments, the reference copy may include copies of files in their native format (e.g., the format of the applications that generated the files rather than a backup or archive format). Or, where the reference copy includes pointers and not actual copies of the identified files, the reference copy may point to secondary copies of the files in their native format, and also include source information relating to the files. Thus, in such embodiments, the user can view or play back the files in the reference copy using the associated source applications, e.g., without having to reformat or un-package the files. The system can also update an existing reference copy. For example, new data that meets the filtering criteria can be added to the existing reference copy. In this manner, the reference copies can reflect incremental changes to the secondary storage data, e.g., after a daily backup, without having to regenerate the entire reference copy.

The reference copy can be viewed by users and may display a listing of the data in the reference copy. The user can utilize reference copies in various ways. In one example, new reference copies may be created from existing reference copies. In this way, reference copies may provide multi-tiered analysis of secondary storage data in the system. The user may restore files using the reference copies. For example, the user may want to select a few files to restore while browsing a particular reference copy. The user may also specify that the data in a reference copy should be stored for a particular retention period.

In this manner, the data storage system according to certain aspects can provide a filtered, digestible global view of secondary storage data in the system. In some embodiments, the user can also view or play back the files in the reference copy using the associated source applications. Because the data storage system can create reference copies based on secondary storage data, the primary storage data can remain available while reference copies are created/updated; in addition, reference copies may be created even when primary storage data becomes unavailable. The data storage system can implement reference copies in a scalable manner using media agents to search the secondary storage data.

According to certain embodiments, a method is provided for creating a filtered representation of secondary copy data in a networked data storage system. The method can include copying data comprising a plurality of files generated by applications executing on one or more client computers from primary storage to secondary storage. The method may further include accessing filtering criteria for identifying a subset of the plurality of files residing in secondary storage. The method can additionally include, with a first module executing on a first computer hardware device comprising one or more processors: instructing a first media agent to identify files residing in secondary storage that meet the filtering criteria; and instructing a second media agent to identify files residing in secondary storage that meet the filtering criteria, the first and second media agents executing on one or more second computer hardware devices comprising one or more processors. The method may further include, with the first module executing on the first computer hardware device comprising one or more processors: receiving from the first media agent an indication as to files identified by the first media agent that reside in one or more secondary storage devices associated with the first media agent; receiving from the second media agent an indication as to files identified by the second media agent that reside in one or more secondary storage devices associated with the second media agent; and creating a filtered representation comprising a data structure that includes references to the files identified by the first media agent and the files identified by the second media agent, wherein the references correspond to the subset of the plurality of files residing in secondary storage that meet the filtering criteria.

In some embodiments, a method is provided for restoring secondary copy data in a networked storage system using a filtered representation of the secondary copy data. The method can include, with a first module executing on a first computer hardware device, providing access to a filtered representation comprising a data structure that includes references to files identified by both a first media agent and a second media agent. The references may correspond to a subset of a plurality of files residing in secondary storage that meet filtering criteria. The first and second media agents may include software modules executing on one or more second computer hardware devices. The method may further include receiving a request to restore a file in the filtered representation from secondary storage to primary storage. The method can additionally include initiating a restore of the file from the secondary storage to primary storage.

According to other aspects of this disclosure, a data storage system may include first computer hardware comprising one or more processors. The data storage system may also include a reference copy module executing on the one or more processors of the first computer hardware. The reference copy module can be configured to access filtering criteria for identifying a subset of a plurality of files residing in secondary storage. The reference copy module may be further configured to instruct a first media agent to identify files of the subset of the plurality of files residing in secondary storage that meet the filtering criteria and that reside in one or more secondary storage devices associated with the first media agent, and instruct a second media agent to identify files of the subset of the plurality of files residing in secondary storage that meet the filtering criteria and that reside in one or more secondary storage devices associated with the second media agent. The first and second media agents may execute on one or more processors of second computer hardware. The reference copy module can be further configured to receive from the first media agent an indication as to files identified by the first media agent. The reference copy module may be also configured to receive from the second media agent an indication as to files identified by the second media agent. The reference copy module can also be configured to create a filtered representation comprising a data structure that includes references to both the files identified by the first media agent and the files identified by the second media agent.

According to yet further aspects of the disclosure, a data storage system may include a first computer hardware device comprising one or more processors. The data storage system may also include a first software module executing on the one or more processors of the first computer hardware device. The first software module can be configured to provide user access to a filtered representation comprising a data structure that includes references to at least first and second files, the first files identified by a first media agent as meeting first filtering criteria and residing in secondary storage associated with the first media agent, the second files identified by a second media agent as meeting the first filtering criteria and residing in secondary storage associated with the second media agent, wherein the first and second media agents execute on one or more processors of a second computer hardware device. The first software module can be further configured to receive a request to restore a file in the filtered representation. The accessed file may be restored from the secondary storage to primary storage.

According to other embodiments, a method of creating a filtered representation of secondary copy data in a networked data storage system is provided. The method can include copying data comprising a plurality of files generated by applications executing on one or more client computers from primary storage to secondary storage. The plurality of files may be stored in the secondary storage in a native format associated with the applications that generated the plurality of files. The method may further include accessing filtering criteria for identifying a subset of the plurality of files. The method can additionally include, with one or more computer processors of at least one first computing device, identifying a subset of the plurality of files that meet the filtering criteria. The method can further include, with one or more processors of at least one second computing device, creating a filtered representation comprising a data structure that includes references to the files in the subset and source information related to the files in the subset. The method may additionally include providing access to the filtered representation. The filtered representation may be viewable by a user and may show a listing of the identified subset of the plurality of files.

According to certain embodiments, a method is provided for restoring secondary copy data in a networked storage system using a filtered representation of the secondary copy data. The method can include providing access to a filtered representation comprising a data structure that includes references to a subset of a plurality of files in secondary storage that meet filtering criteria and includes source information related to the files in the subset. The subset of the plurality of files may be stored in a native format associated with software or applications that generated the plurality of files. The subset of the plurality of files may be or may have been identified by one or more first software modules executing on one or more first computing devices. The filtered representation may be viewable by a user and may show a listing of the subset of the plurality of files. The method may further include, with a second software module executing on a second computing device: receiving a request to restore a file in the filtered representation; accessing the reference to the file in the data structure; and initiating copying of the file from the secondary storage to primary storage.

In some embodiments, a data storage system is provided for creating a filtered representation of secondary copy data. The data storage system may include computer hardware comprising one or more processors. The data storage system may also include a storage manager module executing in the one or more processors of the computer hardware. The storage manager module can be configured to initiate copying of data comprising a plurality of files generated by applications executing on one or more client computers from primary storage to secondary storage. The plurality of files may be stored in the secondary storage in a native format associated with the applications that generated the plurality of files. The storage manager module may be further configured to access filtering criteria for identifying a subset of the plurality of files. The storage manager module can be further configured to instruct a media agent module executing in one or more processors to identify a subset of the plurality of files that meet the filtering criteria. The storage manager module may also be configured to create a filtered representation comprising a data structure that includes references to the subset of the plurality of files identified by the media agent module that meet the filtering criteria and source information related to the files in the subset. The storage manager module may be configured to provide access to the filtered representation. The filtered representation may be viewable by a user and may show a listing of the identified subset of the plurality of files.

According to other aspects of this disclosure, a data storage system is provided for restoring secondary copy data using a filtered representation of the secondary copy data. The data storage system may include first computer hardware comprising one or more processors. The data storage system may also include a first software module executing in the one or more processors of the first computer hardware. The first software module can be configured to provide access to a filtered representation comprising a data structure that includes references to a subset of a plurality of files in secondary storage that meet filtering criteria and source information related to the files in the subset. The plurality of files may be stored in a native format associated with software or applications that generated the plurality of files. The filtered representation may be viewable by a user and may show a listing of the subset of the plurality of files. The subset of the plurality of files may be or may have been identified by a plurality of second software modules executing in one or more processors of second computer hardware in response to instructions received from the first software module. The first software module may be further configured to receive a request to restore a file in the filtered representation. The first software module can be further configured to access information relating to the file in the filtered representation. The first software module may also be configured to initiate restoring of the file from the secondary storage to primary storage.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

Systems and methods are described herein for generating and using a filtered, digestible reference copy from secondary copy data. Examples of such systems and methods are discussed in further detail herein, e.g., with respect to FIGS.

2-5. Moreover, it will be appreciated that reference copies can be generated using secondary copy data generated by information management systems such as those that will now be described with respect to FIGS. 1A-1E. And, as will be described, the componentry for implementing reference copy functionality can be incorporated into such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
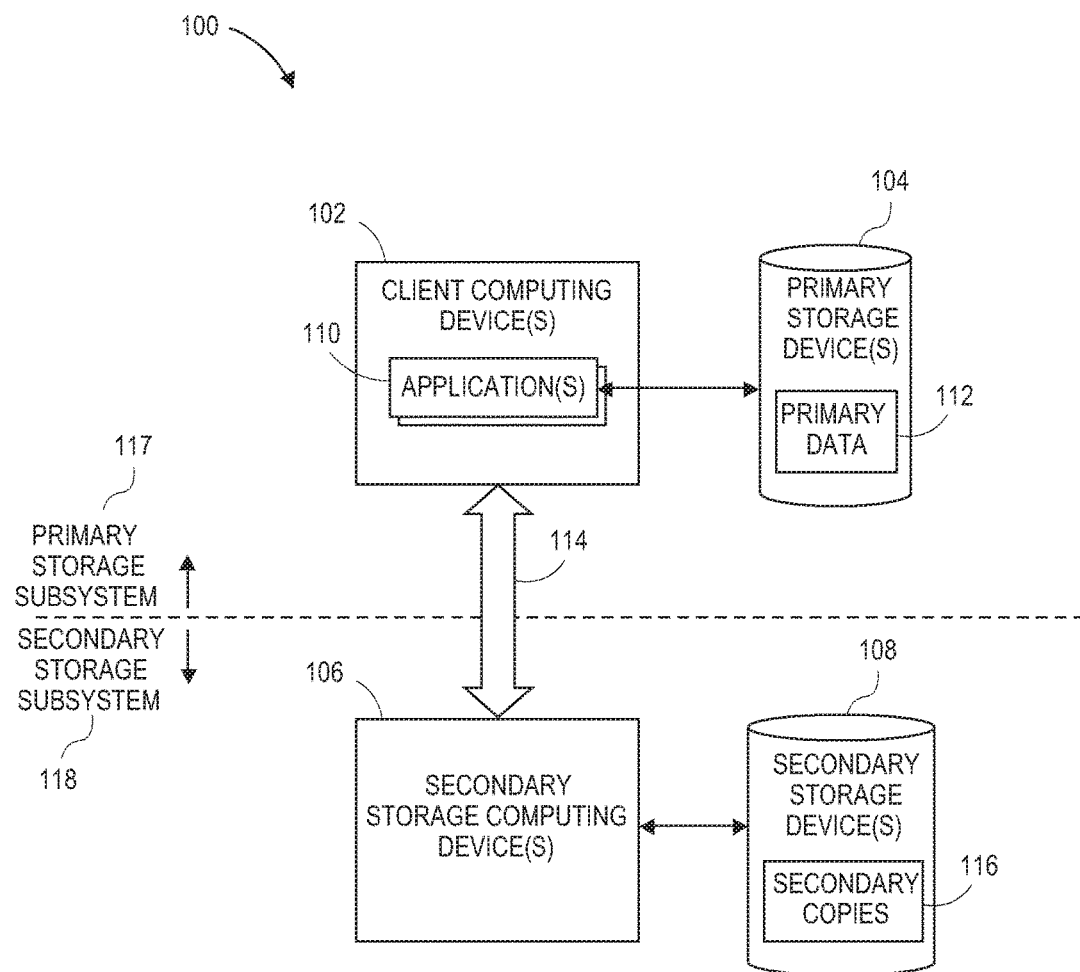
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as or information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
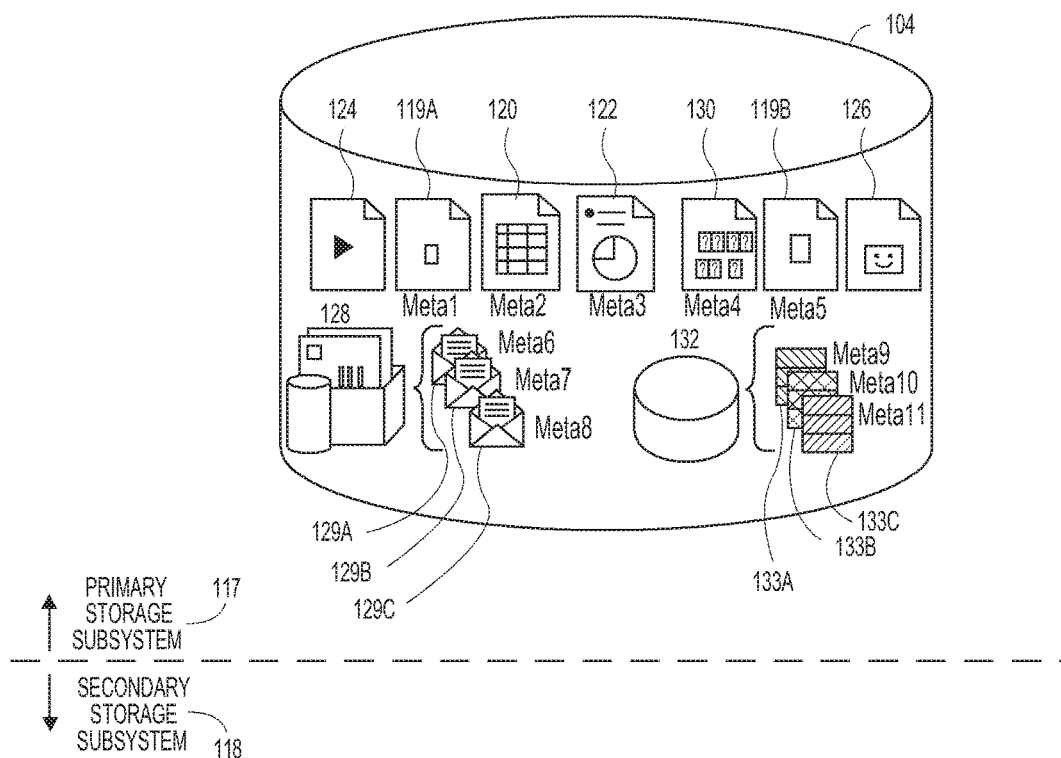
FIG. 1B is a detailed view of a primary storage device, a secondary storage device, and some examples of primary data and secondary copy data.
Figure 1B:
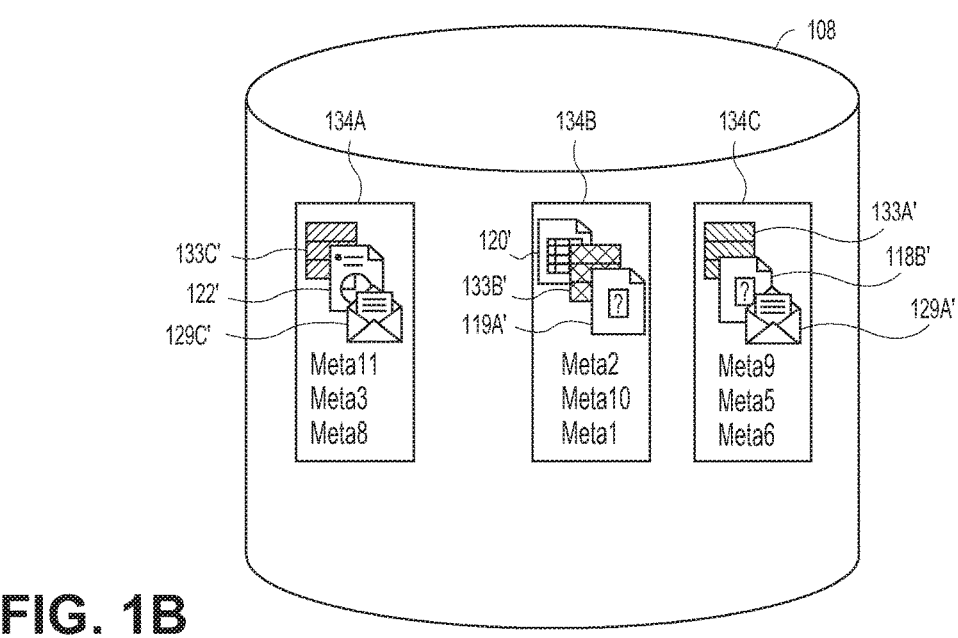

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
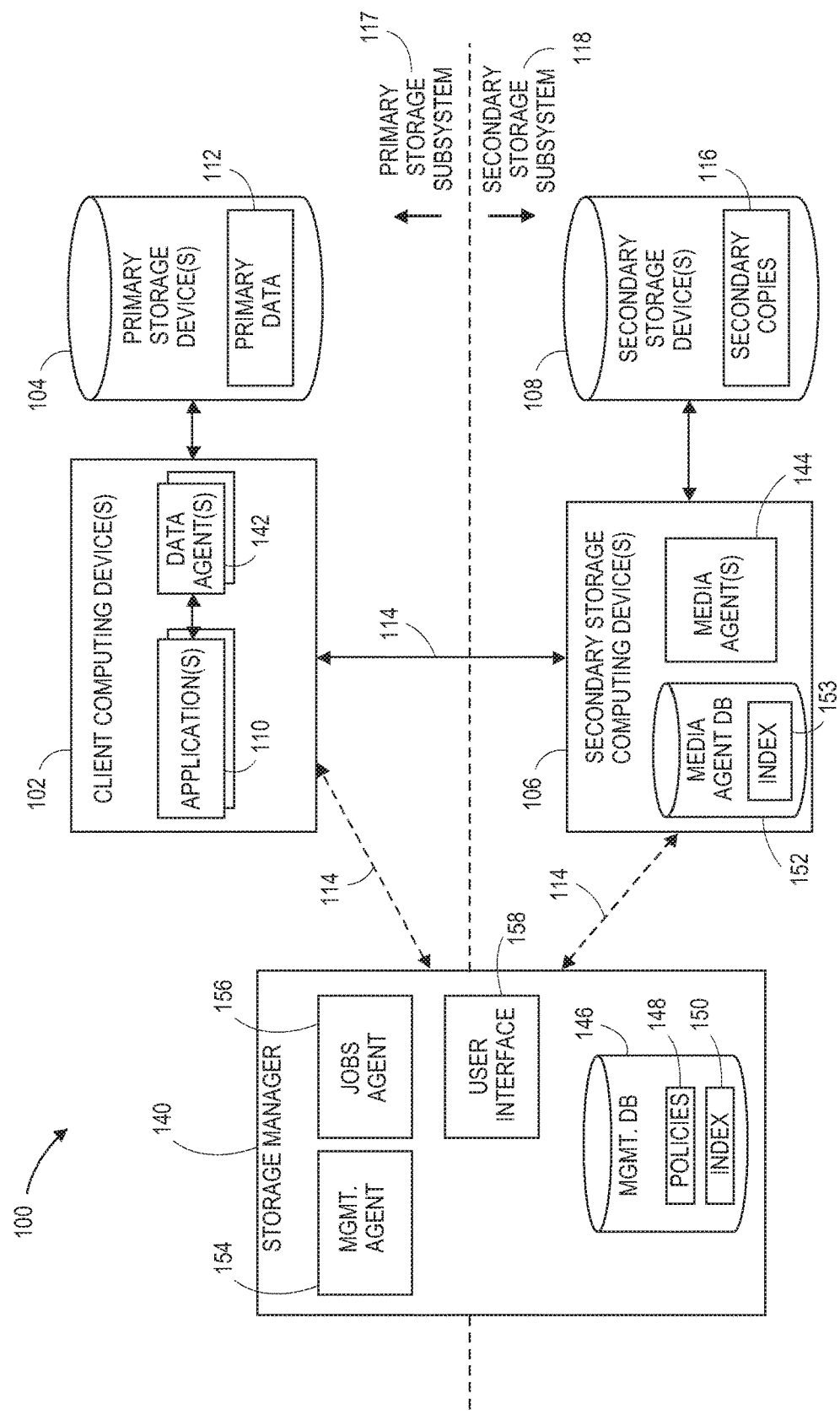
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 by even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
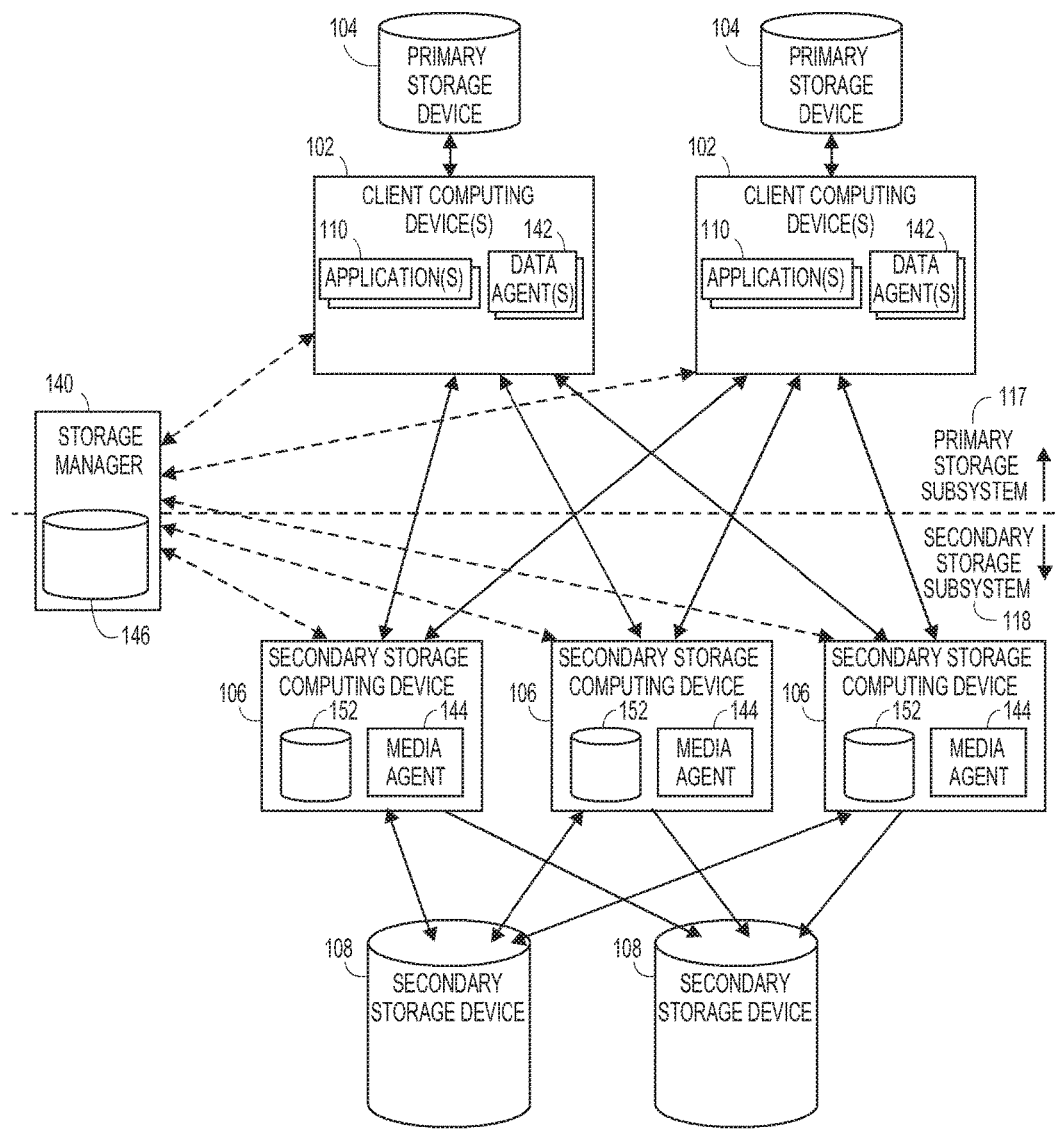
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "subclients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
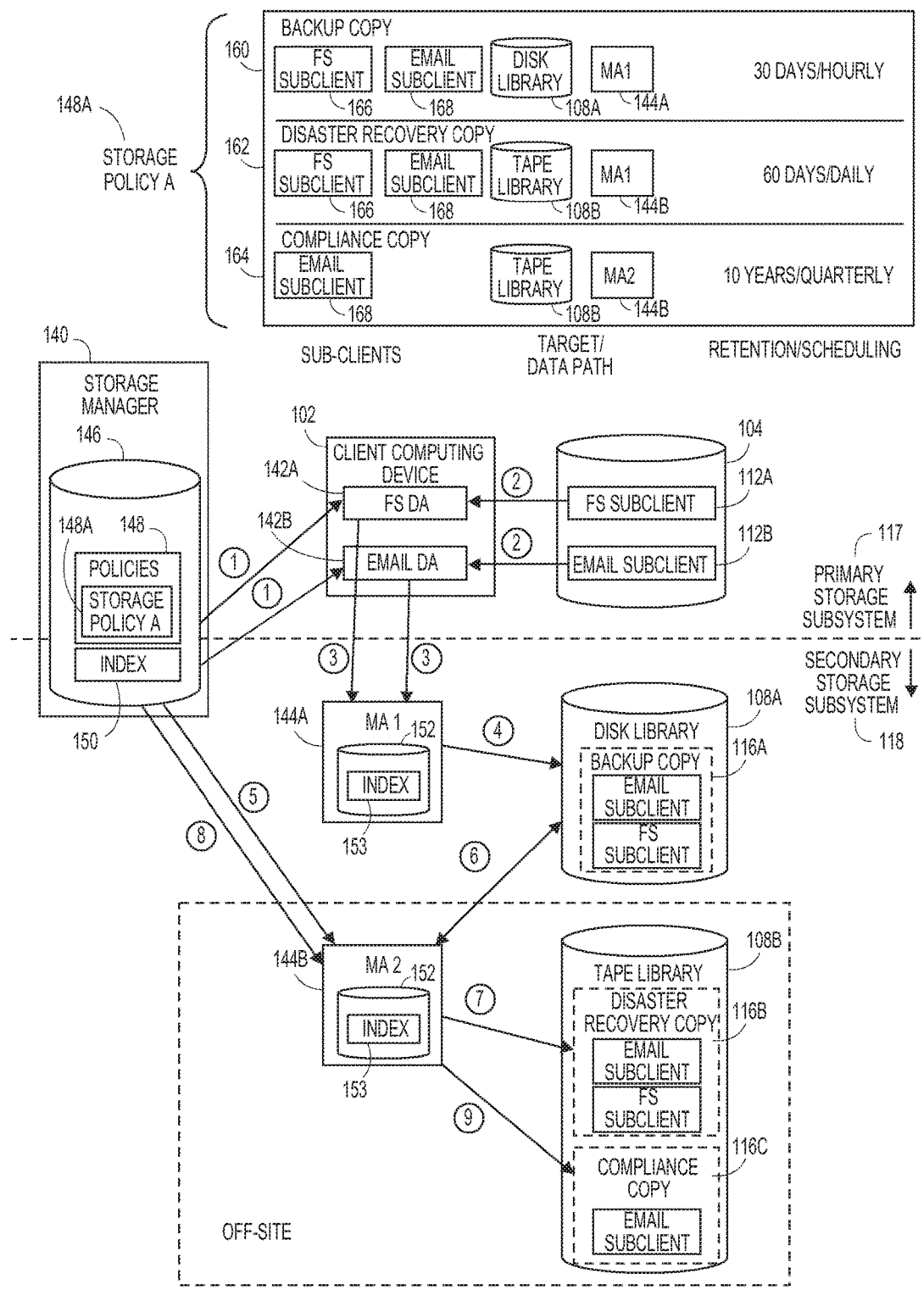
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

The systems and methods described with respect to FIGS. 1A-1E can be used for generating and using a filtered, digestible, reference copy of secondary copy data. For instance, the system of FIG. 1D can include a reference copy module (not shown) that generally creates, updates, and manages reference copies for a data storage system. In some embodiments, the reference copy module is a software module that forms a part of or resides on the storage manager 140 or, alternatively, the media agents 144. The reference copy module can additionally be a software module executing on one or more of the client computers 102. In some embodiments, the reference copy module may be implemented as a part of the data agent 142. The reference copy module will be discussed in more detail with respect to FIGS. 2-5.

An Example Data Storage System for Implementing Reference Copies

Figure 2:
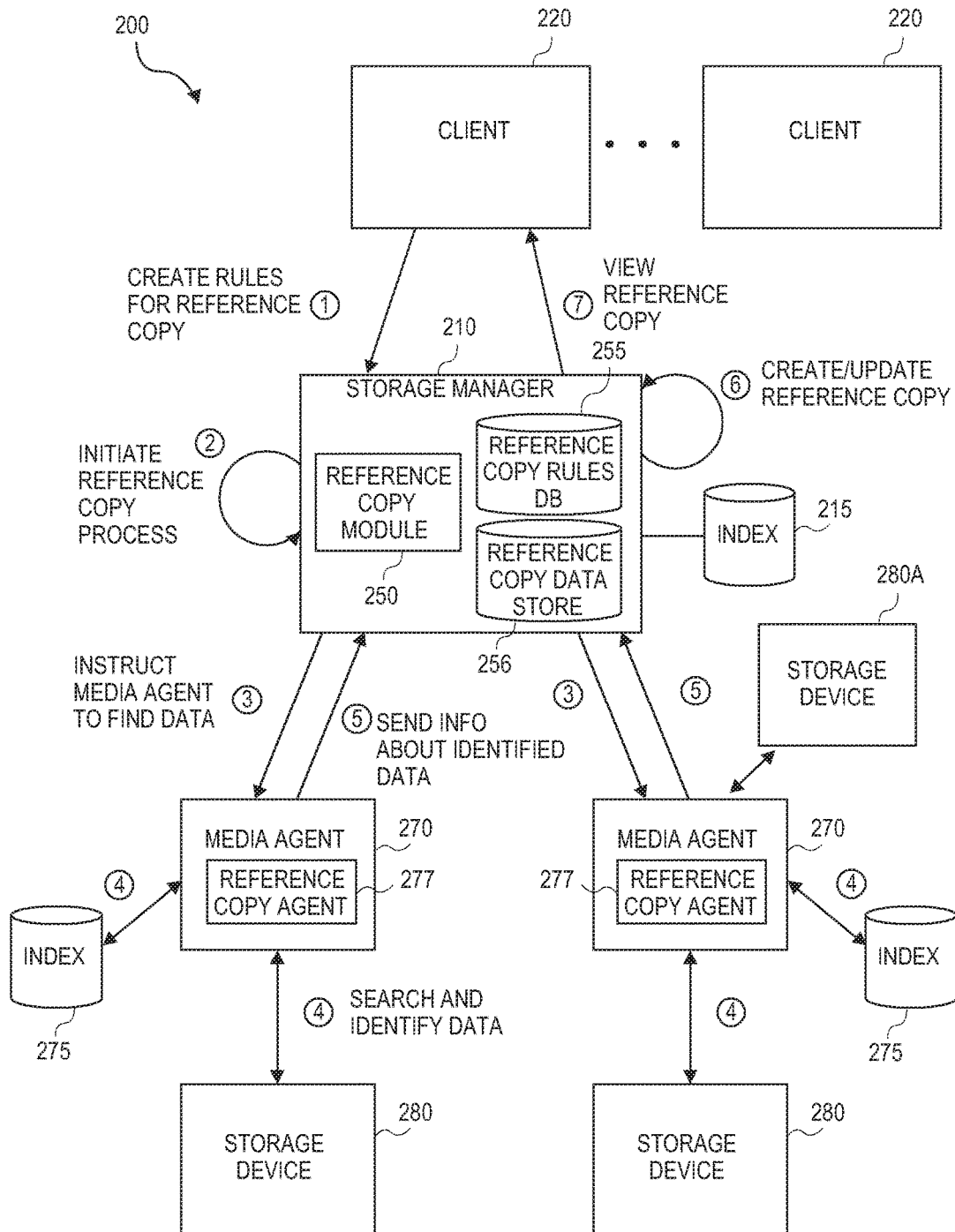
FIG. 2 is a data flow diagram illustrative of the interaction between the various components of an example storage system configured to implement reference copies according to certain embodiments.

FIG. 2 is a data flow diagram illustrative of the interaction between the various components of an example storage system 200 configured to implement reference copy functionality according to certain embodiments. As illustrated, the example data storage system 200 includes a storage manager 210, one or more clients 220, a reference copy module 250, one or more media agents 270, and one or more secondary storage devices 280. The system 200 and corresponding components of FIG. 2 may be similar to or the same as the system 200 and similarly named components of FIG. 1D. Moreover, depending on the embodiment, the system 200 of FIG. 2 may additionally include any of the other components shown in FIG. 1D that are not specifically shown in FIG. 2 (e.g., one or more data agents, one or more applications, an information store, etc.). The system 200 may include one or more of each component. All components of the system 200 can be in direct communication with each other or communicate indirectly via the client 220, the storage manager 210, the media agent 270, or the like. In certain embodiments, some of the components in FIG. 2 shown as separate components can reside on a single computing device, or vice versa. For example, the reference copy module 250 can be on the storage manager 210 or on a separate computing device.

With further reference to FIG. 2, the interaction between the various components of the example data storage system will now be described in greater detail with respect to data flow steps indicated by the numbered arrows.

At data flow step 1, a user creates rules for a reference copy. A "reference copy" may refer to a filtered view or representation of secondary storage data in the data storage system 200. Secondary storage data or secondary copy data used for creating the reference copy resides in the secondary storage devices 280. For example, the secondary storage data may be created through a backup operation (or other type of secondary copy operation) as described above, for example, with respect to FIGS. 1D and 1E. A reference copy may include references to a subset of the files or other data stored in the storage devices 280 that meets certain criteria. The rules for the reference copy may include filtering criteria for determining what data belongs in or is associated with the reference copy. The user can define the criteria for the reference copy according to the user's requirements. For example, the user may want a reference copy that includes all files in secondary storage 280 corresponding to accounting, or a reference copy that includes all PDF files residing in the secondary storage devices 280. A reference copy can provide a filtered, digestible global view of secondary storage data.

The user may define the reference copy rules at a client 220. In some embodiments, the user may define the rules through the storage manager 210 (e.g., the storage manger 210 console). In some cases, a system administrator may define the rules. The rules may also be preconfigured in the storage manager 210. For instance, the storage manager 210 may access default rules for a reference copy if user-defined reference copy rules do not exist.

After the user defines the rules, the reference copy module 250 may receive and store the reference copy rules. As explained above, the reference copy module 250 may be a part of the storage manager 210, may be a part of another component in the system 200, or may reside on a separate computing device from other components in the system 200. In some embodiments, the storage manager 210 may perform the functions and/or operations of the reference copy module 250. The reference copy rules may be stored in the reference copy rules database 255. The reference copy rules database 255 may be a part of the storage manger 210, may be a part of the reference copy module 250, may be a part of another component in the system 200, or may be on a separate computing device. In some embodiments, the rules may be stored in the index 215. The index 215 may store information about the system 200, such as configuration settings. The index 215 may be similar to the index associated with the media agent database 152 shown in FIG. 1D.

At data flow step 2, the reference copy module 250 initiates the reference copy process. The reference copy module 250 may initiate the reference copy process according to a schedule. For example, the reference copy module 250 may repeatedly apply the rules after the passage of a pre-determined amount of time, such as on a regular basis (e.g., after a particular time interval, such as a certain number of hours or days), or on an intermittent basis. The reference copy rules may also be event-based and may be triggered by certain events. For example, the reference copy rules may run after a scheduled (e.g., daily, weekly, etc.) backup has completed. The user may also request to apply the rules at a particular time, and the rules may be applied when the user request is received. The reference copy rules may be implemented as storage policies. Such policies may be run according to a schedule, on an event basis, at user request, etc. as explained above. The storage manager 210 may manage and store storage policies.

The reference copy module 250 may apply the reference copy rules to data in secondary storage, such as the storage devices 280 shown in FIG. 2. The reference copy module 250 may apply the rules after the data has been backed up to secondary storage from primary storage. The data may include files generated by software or applications executing on one or more clients 220. Secondary storage in the system 200 may include multiple storage devices 280. As shown, each media agent 270 may be associated, interface with and conduct data to and from a particular storage device 280 (or group thereof). The media agent 270 and storage devices 280 may be paired based on the type of data managed by the media agent 270 and/or the type of data stored by the storage devices 280. For instance, media agents 270 and storage devices 280 can be associated with the following data types, without limitation: file system data (e.g., Windows file system data), database data (e.g., Exchange, SAP, DB2, SQL, etc.), email data (e.g., Exchange), etc. For example, a media agent 270 may manage Exchange data, and the Exchange media agent 270 may conduct data to and from one or more secondary storage devices 280 that store Exchange data. Similarly, a media agent 270 may manage Windows file system data, and the Windows file system media agent 270 may conduct data to and from storage devices 280 that store file system data. One media agent 270 may manage one type of data, or may manage multiple types of data. A media agent 270 may be paired with one storage device 280, or may be paired with multiple storage devices 280 such as in the manner shown in FIG. 1D.

In some embodiments, the data in the secondary storage is backed up in native format, e.g., the format of the application that produced the data. When the data is backed up in native format, the properties and metadata of the data may be accessible directly from the data, e.g., without having to reformat or unpackage the data, such as where the data is stored in a backup or archive format. For example, if an email (e.g., Exchange email) is stored in its native format, the properties relating to the email, such as sender, recipient, subject matter, may be obtained by accessing or searching the email itself. If the email is not stored in its native format, e.g., stored as a file, such properties may be lost and may not be obtained directly from the email.

While described with respect to a backup copy operation for the purposes of illustration, the techniques described herein are compatible with other types of storage operations, such as, for example, replication, snapshots, archiving and the like. A description of these and other storage operations compatible with embodiments described herein is provided above.

The reference copy rules may filter data based on a wide variety of parameters, including file attributes, content of the data, metadata associated with the data, or any other appropriate characteristic or attribute of the data. The reference copy rules may be based on file attributes, such as file type, file extension, file name, filepath, modified time, access time, etc. For example, reference copy rules based on file type or file extension may specify that all PDF files should be included in a reference copy, or specify that all Word files should be included in a reference copy.

The reference copy rules may also be based on certain (e.g., user-specified) search terms, and the reference copy module 250 may filter the data based on the results of the search. For instance, where the data is organized in a plurality of files, the user specifies certain search terms, and the media agents 270 searches through the content of the files, metadata associated with the files, or both. The search can be a semantic search, concept search, or any other type of enhanced search.

Where the files comprise emails, for example, the reference copy rules can filter data according to email content, subject matter as indicated by content and/or metadata, or parameters related to email. Email parameters can include mailbox owner, sender, receiver, date, etc. As an example, the reference copy rules may filter emails relating to financial documents based on subject matter (e.g., subject matter of content and/or metadata could indicate that the email is associated with the accounting department of an organization). As another example, the reference copy rules may select emails sent to and/or received from a certain employee (e.g., the CEO). The reference copy module 250 can identify such emails based on metadata indicating the mailbox owner, the sender or recipient email address, or some other appropriate means.

Multiple metadata properties may be used together, and metadata properties could be used in conjunction with content. Metadata may be stored in a metabase, as described in greater detail in application Ser. No. 11/563,940, now U.S. Pat. No. 7,747,579, issued Jun. 29, 2010, herein incorporated by reference in its entirety.

A user may specify reference copy rules according to how the user wants to filter the secondary storage data in the system 200. The reference copy rules may be defined in any manner described above, and may be based on file attributes, application, search, content, metadata, etc., and any combination thereof.

Once the user specifies the reference copy rules, the reference copy module 250 may determine which sources for secondary storage data (e.g., storage devices 280) need to be searched in order to identify data for a particular reference copy. For instance, particular storage devices 280 may be associated with specific types of data. In a specific example, all Exchange data in the system 200 may be stored on Storage Devices A and Storage Devices B, while all PDF data in the system 200 may be stored on Storage Devices C and D. If reference copy rules specify that a reference copy should include all PDF data, the reference copy module 250 may determine that Storage Devices C and D need to be searched in order to identify data for the reference copy. In this manner, depending on the requested data, only some of the storage devices can be searched, and the amount of time for a search can be reduced.

The reference copy module 250 may determine which sources need to be examined, for example, by referring to configuration information or settings related to storage devices 280 and media agents 270. Such information may be included in the configuration information or settings for the system 200. The configuration information or settings may include information associated with storage devices 280 and data stored on the storage devices 280, and may also include information associated with media agents 270. For example, the configuration information may specify that certain storage devices 280 store particular types of data, and specify that certain media agents 270 manage these storage devices 280. The configuration information and settings may be stored in the storage manager 210 (e.g., in the index 215), or on another computing device.

The reference copy module 250 may have access to the configuration information and settings, and may be able to determine which storage devices 280 need to be searched and/or which corresponding media agents 270 need to be instructed in order to search the storage devices 280. The reference copy module 250 may make such determination when the reference copy rules are stored and add information about storage devices 280 and/or media agents 270 with the reference copy rules. The reference copy module 250 may also make the determination at the time the reference copy rules run.

At data flow step 3, the reference copy module 250 instructs one or more media agents 270 to find data that meets the rules for reference copies. The reference copy module 250 may not send the reference copy rules to the media agents 270. Instead, as explained above, the reference copy module 250 can determine which storage devices 280 should be searched and/or which media agents 270 should be instructed to search these storage devices 280. In some embodiments, the reference copy module 250 may determine only which media agents 270 should be instructed, without determining which storage devices 280 should be searched. Such information may be included or stored with the reference copy rules, or the reference copy module 250 may refer to the configuration or settings when the reference copy rules run. The reference copy module 250 can instruct specific media agents 270 based on such configuration information. The reference copy module 250 may instruct a first media agent 270 to find data meeting the filtering criteria, and may instruct a second media agent 270 to also find data meeting the same filtering criteria. If the reference copy module 250 is on a separate computing device from the storage manager 210, the reference copy module 250 may instruct the media agents 270 through the storage manager 210.

In a specific example, reference copy rules may specify that all PDF files need to be included in a reference copy. The reference copy module 250 accesses the configuration information and determines that Storage Devices C and D store PDF files. Media Agent 1 may be paired with Storage Device C, and Media Agent 2 may be paired with Storage Device D. The reference copy module 250 instructs Media Agent 1 to search Storage Device C for all PDF files, and instructs Media Agent 2 to search Storage Device D for all PDF files.

Because multiple media agents 270 can be used to search through the data to be filtered, the process of filtering the secondary storage data in the system 200 can be managed and performed in a scalable manner. As more secondary data is added to the system 200, additional storage devices 280 and media agents 270 can be added. The additional storage devices 280 can be searched using the additional media agents 270. In this manner, the workload for creating or updating reference copies can be distributed across the system 200.

At data flow step 4, one or more media agents 270 search and identify the data that meets the rules for reference copies. Each media agent 270 searches the data associated with it. A media agent 270 may access an index 275 associated with it in order to search and identify the data for the reference copies. The information in the index 275 may be collected and stored in the index 275 while backup is running. For example, the media agent 270 may include a reference copy agent 277 that collects information about the data while the data is copied to the storage devices 280. The reference copy agent 277 can collect information about file system data, email data, etc. For instance, if the data is file system data, the reference copy agent 277 can collect information like file name, filepath, modified time, access time, etc. If the data is email data (e.g., Exchange data), the reference copy agent 277 can additionally collect information like mailbox owner, sender, recipient, subject, etc. The media agent 270 may also access the data in the storage devices 280 in order to search and identify the data for the reference copies. In some embodiments, the media agent 270 may identify the data for the reference copies by accessing only the index 275, without accessing the data in the storage devices 280. For example, in certain cases, the media agent 270 may examine only the metadata in the index 275 to identify the data that satisfies the filtering criteria, without actually accessing the storage devices 280.

Data in the storage devices 280 may be analyzed at any granularity. For instance, the data can be organized and/or processed as files (e.g., emails, Microsoft Office documents, media files, etc.), pages, which may span more than one file, data blocks, which may correspond to portions of files, or in any other appropriate fashion.

In some embodiments, the media agent 270 may move or copy the identified data to another storage device(s) 280. For example, all PDF files may be moved to a backup tape so that all data can be stored together. The moved or copied data may be stored or retained for a specific period of time.

At data flow step 5, the media agents 270 send information about the identified data to the reference copy module 250. The identified data may include multiple files, and a media agent 270 may send pointers to the files to the reference copy module 250. In some embodiments, the media agent 270 may send copies of the actual files to the reference copy module 250. Files may be stored in native format of the applications that generated the files. Information sent to the reference copy module 250 may include source information for each file, such as the source client, source device, the source application, etc. For example, a file that is backed up in a storage device 280 may be identified as being backed up from an information store associated with Client A and as having a specified filepath in the information store.

The media agent 270 may associate the identified data with a logical entity. Such logical entity may be referred to as a virtual client or a dummy agent. The logical entity may not have a physical presence, but act as a holding entity for the filtered reference copy data. The media agent 270 may associate data associated with all reference copies with the logical entity. The data for reference copies may be accessed and/or viewed, for example, by accessing the data associated with the logical entity.

At data flow step 6, the reference copy module 250 creates a reference copy or updates an existing reference copy. If a reference copy corresponding to certain reference copy rules does not exist, the reference copy module 250 may create a new reference copy. A reference copy may include references to the filtered data, or the subset of secondary storage data, that meets the criteria specified in the rules for the reference copy. The references for a reference copy may be stored in a data structure. In some embodiments, a reference may be a pointer to a file in the subset and may not include a copy of the file. In other embodiments, a reference may include a copy of the file in the subset. In certain embodiments, the data structure may include information regarding the files in the subset. Such information may include the source client, source filepath, source device, source application, etc. for each file in the subset. In certain embodiments, the reference copy includes data stored in native format, and includes embedded information about the source of the data, such as source application, source device, source client, etc.

Reference copies and associated information and/or data may be stored in the reference copy data store 256. The reference copy data store 256 may also include an index, and the index may store information about the identified data forwarded by the media agents 270. In FIG. 2, the reference copy data store 256 is shown to be a part of the storage manager 210, but the reference copy data store 256 may be separate from the storage manager 210 or may be a part of another component in the system 200. In embodiments where the reference copy includes copies of files themselves, the files may be moved or copied to one or more other storage devices 280a, as explained above. The reference copy storage devices 280a can include any type of storage device, e.g., tape media, disk drive, cloud, etc. The type and/or location of reference copy storage device(s) 280a may be specified in a storage policy associated with the reference copy or in configuration information or settings related to storage devices 280 and/or media agents 270. In some embodiments, the reference copy data store 256 may also be a part of the reference copy storage device(s) 280a.

If the reference copy corresponding to certain reference copy rules already exists, the reference copy module 250 may update the reference copy to include identified data that is not already included in the reference copy. In this manner, a reference copy may be updated to reflect the most recent data that meets the filtering criteria. For example, reference copy data may be up-to-date as of the most recent backup, or may reflect the current state of data in the storage devices 280.

A reference copy may be created from another reference copy, and may include a subset of the data in the existing reference copy. For example, a reference copy including all invoice PDF files may be created from an existing reference copy that includes all PDF files. In some cases, a reference copy includes subsets of data from more than one other reference copy. For example, a reference copy including all emails from a particular user may be created from a plurality of other reference copies including email data.

At data flow step 7, the user views the reference copy on the client 220. For example, the reference copy module 250 may generate a graphical user interface ("GUI") for display. In this manner, the files or other data in the reference copy is viewable by a user, e.g., by show a listing of the files. The listing may not show secondary storage data that is not included in the subset, and thus presents a filtered, digestible view to the user. The listing may be accessed through the logical entity that is associated with the reference copies. The user may browse the reference copy and the listing, for example, by browsing data associated with the logical entity. The user may view the files in the reference copy. The user may also select files in the reference copy in order to restore the files. In some embodiments, the reference copy includes the files in native format and embedded information about their source (e.g., source application, source location, etc.), and the user may be able to preview or selectively play back the files using their native applications.

The reference copies and the data in the reference copies may be viewable only by authorized users. For example, a reference copy that includes confidential information may be accessible only to the management of an organization. Controlling access to reference copies may be implemented using security policies.

In this way, the system 200 can provide a digestible, global view of the secondary storage data in the system 200. In addition, the reference copies are created using secondary copy data (e.g., backup data). Therefore, primary data can remain accessible while the reference copies are created/updated, and the reference copies can be created even when the source primary data is no longer available. Because the secondary storage data is searched and extracted by the media agents 270, which can be scalable, the system 200 can provide scalability in implementing filtered reference copies (e.g., by adding more media agents 270). Reference copies may be created from other reference copies, and the system 200 can provide multi-tiered analysis of secondary storage data.

Now a specific example will be explained in detail with respect to FIG. 2. Corporation C backs up surveillance data on a daily basis along with the corporation's other data. The surveillance data may be from various locations, such as branch offices. The surveillance data may be backed up to different storage devices 280 in the system 200. User A works in the security department of Corporation C and wants to view and access all surveillance data, preferably from a single user interface (UI). User A defines rules for a reference copy, e.g., at a client computer 220. User A may define the rules based on search terms, metadata, properties of the data, etc. The reference copy rules may include the filtering criteria for the reference copy. For example, User A may define the rules to extract data that includes surveillance data as the subject matter, or may define the rules to extract data that is identified as surveillance data in the properties. User A may further specify that User A only wants surveillance data that is in WMV format. User A may define the rules to include only files with file extension ".wmv" or file type "WMV." After User A creates the reference copy rules, the rules may be sent to and stored by the reference copy module 250.

User A's reference copy rules run, e.g., after the scheduled daily backup of primary storage data completes. The reference copy module 250 knows from configuration information and settings that surveillance data is backed up to Storage Devices 1 through 10. Storage Devices 1-10 are managed by Media Agents 1-10, respectively. The reference copy module 250 instructs each of Media Agents 1-10 to search and identify data that meets the filtering criteria (e.g., WMV surveillance data for User A's reference copy). Each of Media Agents 1-10 accesses its own index 275 and/or the storage devices 280 it manages in order to identify/extract the data for the reference copy. Each media agent 270 sends information about the identified data to the reference copy module 250. Such information may include pointers to the files, copies of the files themselves, source information for the files, etc. Where copies of the files are used, the media agents 270 may move the identified data to another secondary storage location, e.g., a tape. Or the media agents 270 may make copies of the identified data at another secondary storage location.

After the reference copy module 250 receives the information about the identified data items from each media agent 270, the reference copy module 250 creates a reference copy that includes references to the WMV surveillance data. The references to the files may include pointers to the files, copies of the files, or both, depending on the embodiment. In some embodiments, the files in the reference copy are stored in native format, and the reference copy includes embedded source information. In such embodiments, the user can view or access the files using their native applications.

Corporation C backs up all the surveillance data in its native format. Accordingly, User A's reference copy can include copies of the surveillance data in the native format (WMV). User A's reference copy can also include embedded source information for the surveillance data, such as the source device and filepath, and source application. The source application may be Windows Media Player. Since User A's reference copy includes native format files and source information, User A can view or play the surveillance data using an application like Windows Media Player. By creating a reference copy that includes all WMV surveillance data, User A can easily manage and access the surveillance data the user wants from a single UI. User A may choose to filter the WMV surveillance data further, e.g., by creating further filtering based on date range, or by creating another reference copy comprising a subset of the first reference copy, based on date range.

Figure 3:
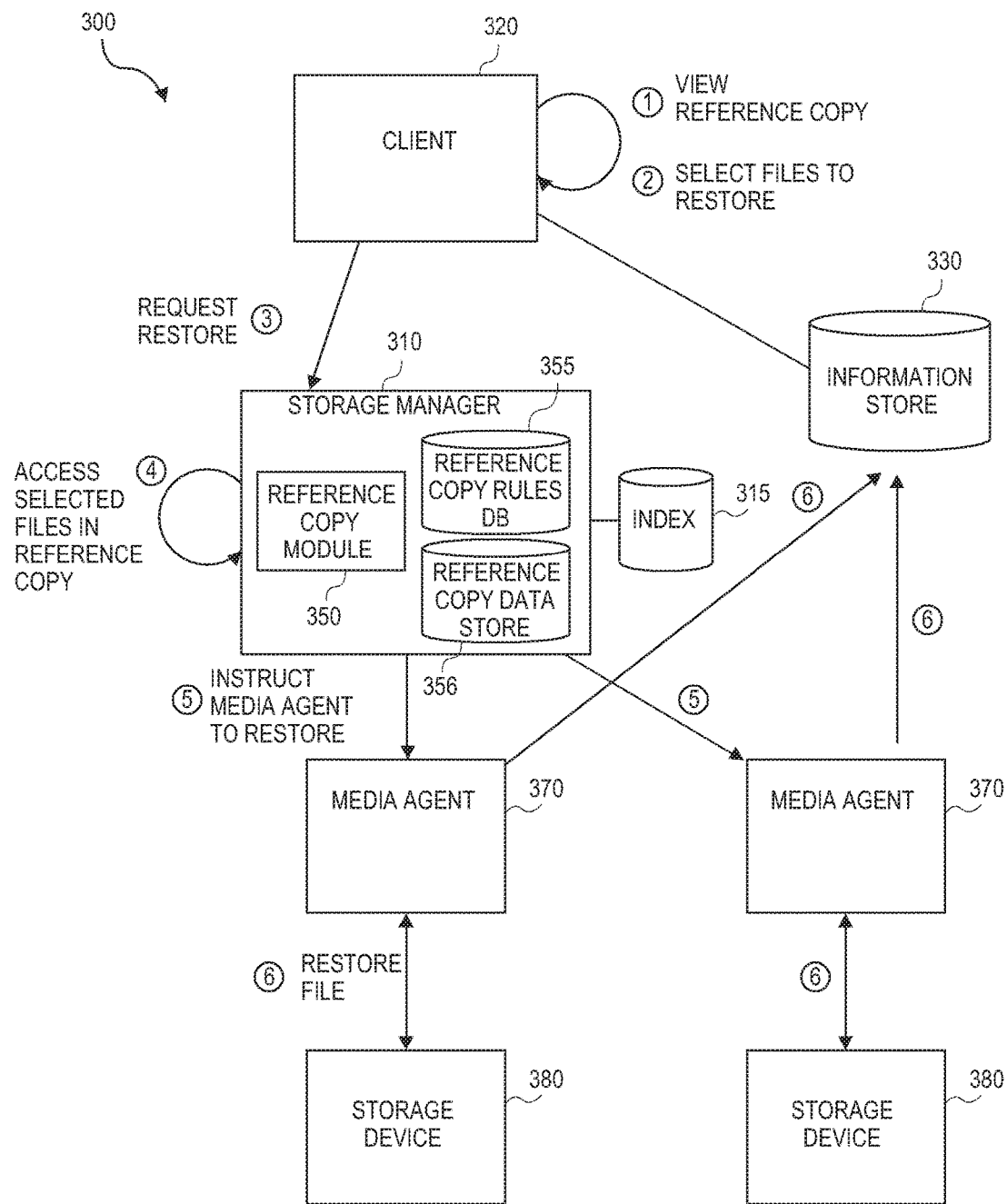
FIG. 3 is a data flow diagram illustrative of the interaction between the various components of another example storage system configured to implement reference copies according to certain embodiments.

FIG. 3 is a data flow diagram illustrative of the interaction between the various components of an example storage system 300 configured to implement reference copies according to certain embodiments. As illustrated, the example data storage system 300 includes a storage manager 310, a client 320, an information store 330, a reference copy module 350, one or more media agents 370, and one or more storage devices 380. Depending on the embodiment, the system 300 of FIG. 3 may additionally include any of the other components shown in FIG. 1D that are not specifically shown in FIG. 3 (e.g., one or more data agents, one or more applications, etc.). The system 300 may include one or more of each component. All components of the system 300 can be in direct communication with each other or communicate indirectly via the client 320, the storage manager 310, the media agent 370, or the like. In certain embodiments, some of the components in FIG. 3 shown as separate components can reside on a single computing device, or vice versa. For example, the reference copy module 350 can be on the storage manager 310 or on a separate computing device.

With further reference to FIG. 3, the interaction between the various components of the example data storage system will now be described in greater detail with respect to data flow steps indicated by the numbered arrows.

At data flow step 1, a user views a reference copy, e.g., at the client 320. As explained above with respect to FIG. 2, a reference copy can provide a filtered view or representation of secondary storage data in the system 300.

At data flow step 2, the user selects files in the reference copy to restore. The user may select one or more files in the reference copy to restore from secondary storage. In the example of FIG. 2, User A may select 2 surveillance videos from the previous week.

At data flow step 3, the client 320 sends a restore request for the selected files to the reference copy module 350. In some embodiments, the restore request may be sent to the storage manager 310. Depending on the embodiment, the reference copy module 350 may be a part of the storage manager 310 as shown, may be a part of another component in the system 300, or may be on a separate computing device.

At data flow step 4, the reference copy module 350 accesses the selected files in the reference copy. For example, the reference copy module 350 may access information about the selected files in the reference copy. For instance, the reference copy module 350 may access the information in order to determine which storage devices 380 store the corresponding files and/or which media agents 370 manage these storage devices 380. The reference copy module 350 may send a request to restore the selected files to the storage manager 310. If the reference copy includes copies of the files rather than pointers to the files, the reference copy module 350 may access the files directly. In such case, the reference copy module 350 may directly copy the files from the reference copy to primary storage, e.g., the information store 330. For example, copies of the files (or other data items) included in the reference copy may be stored in another secondary storage device (e.g., storage device 280a in FIG. 2), which may be tape media, etc.

At data flow step 5, the storage manager 310 instructs the media agent 370 to restore the selected files. For example, the storage manager 310 may instruct the media agents 370 associated with the storage devices 380 that include the selected files to retrieve the selected files.

At data flow step 6, the media agent 370 restores the selected files. The media agent 370 may copy the selected files to the information store 330. After the selected files are restored, the user can access the files, e.g., through applications associated with the files.

Figure 4:
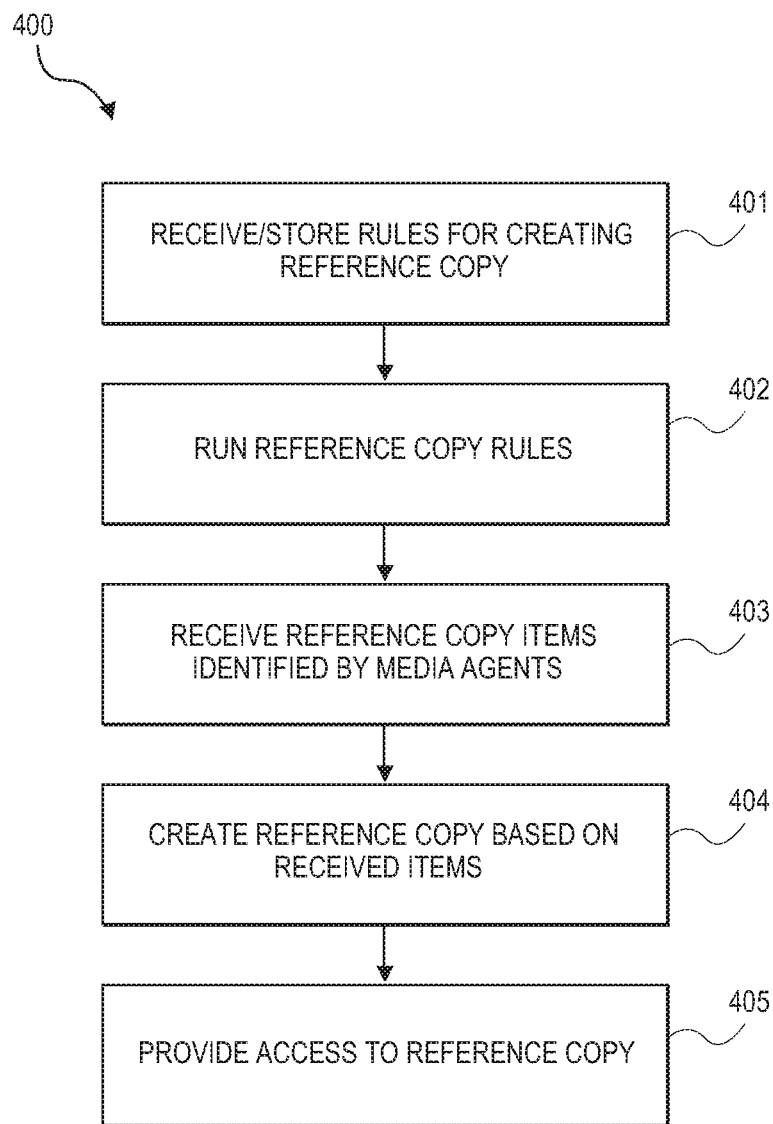
FIG. 4 is a flow diagram illustrative of one embodiment of a routine for creating reference copies according to certain embodiments.

FIG. 4 is a flow diagram illustrative of one embodiment of a routine 400 implemented by a data storage system for creating reference copies. The routine 400 is described with respect to the system 200 of FIG. 2. However, one or more of the steps of routine 400 may be implemented by other data storage systems, such as those described in greater detail above with reference to FIG. 1D. The routine 400 can be implemented by any one, or a combination of, a client, a storage manager, a data agent, a reference copy module, a media agent, and the like. Moreover, further details regarding certain aspects of at least some of steps of the routine 400 are described in greater detail above with reference to FIG. 2. Although described in relation to backup operations for the purposes of illustration, the process of FIG. 4 can be compatible with other types of storage operations, such as, for example, migration, snapshots, replication operations, and the like.

At block 401, the reference copy module 250 receives and/or stores rules for creating a reference copy. The reference copy rules may include filtering criteria for reducing the secondary copy data into a manageable, filtered subset.

At block 402, the reference copy module 250 runs the reference copy rules. The reference copy rules may run, e.g., according to a schedule, based on an event, at user request, etc. The reference copy module 250 may instruct media agents 270 to search and identify data items in the storage devices 280 that meet the filtering criteria.

At block 403, the reference copy module 250 receives reference copy items identified by media agents 270. At block 404, the reference copy module 250 creates a reference copy based on the received items. The reference copy module 250 associates the received data items with the reference copy, e.g., by including pointers to the data items, copying the data items to the reference copy data store 256, etc. The reference copy may also include information about the data items. Reference copies and related information may be stored in the reference copy data store 256. At block 405, the reference copy module 250 provides access to the reference copy. For example, the user can view or browse the reference copy from a user interface.

The routine 400 can include fewer, more, or different blocks than those illustrated in FIG. 4 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 5:
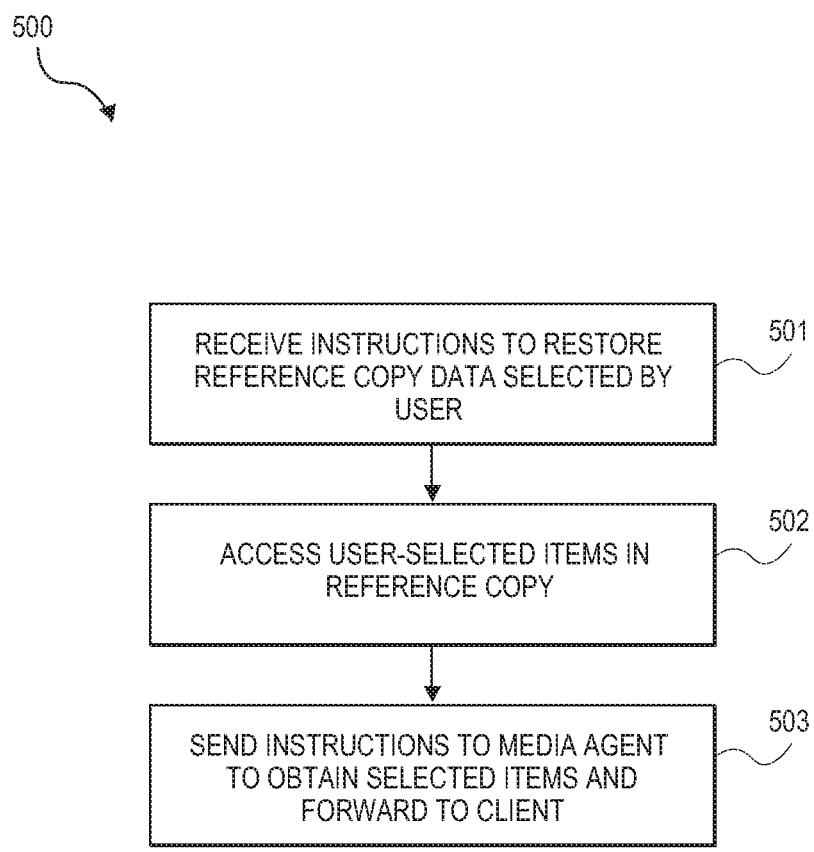
FIG. 5 is a flow diagram illustrative of one embodiment of a routine for restoring data using reference copies according to certain embodiments.

FIG. 5 is a flow diagram illustrative of one embodiment of a routine 500 implemented by a data storage system for restoring data using reference copies. The routine 500 is described with respect to the system 300 of FIG. 3. However, one or more of the steps of routine 500 may be implemented by other data storage systems, such as those described in greater detail above with reference to FIG. 1D. The routine 500 can be implemented by any one, or a combination of, a client, a storage manager, a data agent, a reference copy module, a media agent, and the like. Moreover, further details regarding certain aspects of at least some of steps of the routine 500 are described in greater detail above with reference to FIG. 3. Although described in relation to backup operations for the purposes of illustration, the process of FIG. 5 can be compatible with other types of storage operations, such as, for example, migration, snapshots, replication operations, and the like.

At block 501, the reference copy module 350 receives instructions to restore reference copy data selected by user. The reference copy data to be restored may include, e.g., files, data items, etc.

At block 502, the reference copy module 350 accesses user-selected items in the reference copy. The reference copy module 350 may access information in the reference copy that relates to the data to be restored. Such information may include where the data is located, which media agents need to be instructed, etc. If the requested data is already included in the reference copy, the reference copy module 350 may provide access to the data in the reference copy (e.g., by copying the data to primary storage), instead of restoring the data from the storage devices 380.

At block 503, the reference copy module 350 sends instructions to media agent 370 to obtain the selected items and forward them to the client 320. If the reference copy module 350 is on a separate computing device from the storage manager 310, the reference copy module 350 may request the storage manager 310 to send instructions to the media agents 370. The appropriate media agent 370 retrieves the data from the storage devices 380 and copies the data to primary storage, e.g., the information store 330. The data may also be copied to primary storage through the storage manager 310.

The routine 500 can include fewer, more, or different blocks than those illustrated in FIG. 5 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of creating a filtered representation of secondary copy data in a networked data storage system, comprising:

using one or more media agents comprising computer hardware, copying data comprising a plurality of files residing in one or more primary storage devices in a primary storage subsystem to one or more secondary storage devices in a secondary storage subsystem to create a backup copy of the plurality of files;

further copying, with the one or more media agents, data associated with the plurality of files to at least one reference copy data store to create at least one reference copy of the plurality of files;

creating an index data structure of the backup copy of the plurality of files and storing the index data structure in the at least one reference copy data store;

wherein the backup copy of the plurality of files is stored in the secondary storage subsystem in a backup format, and the at least one reference copy of the primary files is stored in a native format associated with applications that generated the plurality of files;

accessing with at least one reference copy module comprising computer hardware, filtering criteria for identifying a subset of the plurality of files, the subset associated with the filtered representation and residing in the backup copy in the secondary storage subsystem;

identifying with the at least one reference copy module, files that meet the filtering criteria based on the index data structure of the at least one reference copy of the plurality of files stored in the at least one reference copy data store without accessing the backup copy of the plurality of files stored in the secondary storage subsystem and without accessing the plurality of files stored in the primary storage subsystem; and providing access to the filtered representation, wherein the filtered representation is viewable by a user and shows a listing of the subset associated with the filtered representation without accessing the backup copy of the plurality of files stored in the secondary storage subsystem and without accessing the plurality of files stored in the primary storage subsystem.

2. The method of claim 1 further comprising:
at least one media agent index comprising metadata related to the plurality of files copied from the one or more primary storage devices to the one or more secondary storage devices; and
wherein a first media agent and a second media agent identify at least some of the files residing in the secondary storage subsystem that meet the filtering criteria by reviewing the media agent index.

3. The method of claim 1 wherein the listing does not include files in the plurality of files that are not in the subset.

4. The method of claim 1 wherein the at least one reference copy comprises copies of the plurality of files themselves.

5. The method of claim 1 wherein source information comprises, for each respective file in the subset, one or more of an indication as to a source computing device associated with the each respective file and a source software application associated with the each respective file.

6. The method of claim 5 wherein the file in the subset is viewed or accessed using the software application associated with the each respective file.

7. The method of claim 1 wherein the at least one reference copy comprises pointers and does not include copies of the plurality of files.

8. The method of claim 1 wherein the at least one reference copy module determines which storage devices in the primary storage subsystem to search to create the at least one reference copy.

9. The method of claim 1 wherein the at least one reference copy module updates the at least one reference copy during the creating of the backup of the plurality of files.

10. The method of claim 1 wherein the at least one reference copy module updates the at least one reference copy based on one or more reference copy rules.

11. A data storage system configured for creating a filtered representation of secondary copy data, comprising:
one or more media agents comprising computer hardware configured to:
initiate copying of data comprising a plurality of files residing in one or more primary storage devices in a primary storage subsystem to one or more secondary storage devices in a secondary storage subsystem to create a backup copy of the plurality of files;
further copy with the one or more media agents data associated with the plurality of files to at least one reference copy data store to create at least one reference copy of the plurality of files,
wherein the backup copy of plurality of files is stored in the secondary storage subsystem in a backup format, and the at least one reference copy of the plurality of files are stored in a native format associated with applications that generated the plurality of files;
at least one reference copy module comprising computer hardware configured to:
create an index data structure of the backup copy of the plurality of files and storing the index data structure in the at least one reference copy data store;
access filtering criteria for identifying a subset of the plurality of files, the subset associated with the filtered representation and residing in the backup copy in the secondary storage subsystem;
identify files that meet the filtering criteria based on the index of the at least one reference copy of the plurality of files stored in the at least one reference copy data store without accessing the backup copy of the plurality of files stored in the secondary storage subsystem and without accessing the plurality of files stored in the primary storage subsystem; and
provide access to the filtered representation, wherein the filtered representation is viewable by a user and shows a listing of the subset associated with the filtered representation that meet the filtering criteria without accessing the backup copy of the plurality of files stored in the secondary storage subsystem and without accessing the plurality of files stored in the primary storage subsystem.

12. The system of claim 11 wherein a first media agent and a second media agent identify at least some of the files residing in the secondary storage subsystem that meet the filtering criteria by reviewing one or more media agent indexes comprising metadata related to the plurality of files copied from the one or more primary storage devices to the one or more secondary storage devices.

13. The system of claim 11 wherein the listing does not include files in the plurality of files that are not in the subset.

14. The system of claim 11 wherein the at least one reference copy comprises copies of the plurality of files themselves.

15. The system of claim 11 wherein source information comprises, for each respective file in the subset, one or more of an indication as to a source computing device associated with the respective file and a source software application associated with the respective file.

16. The system of claim 15 wherein the file in the subset is viewed or accessed using the software application associated with the file.

17. The system of claim 11 wherein the at least one reference copy comprises pointers and does not comprise copies of the plurality of files.

18. The system of claim 11 wherein the at least one reference copy module determines which storage devices in the primary storage subsystem to search to create the at least one reference copy.

19. The system of claim 11 wherein the at least one reference copy module updates the at least one reference copy during the creating of the backup of the plurality of files.

20. The system of claim 11 wherein the at least one reference copy module updates the at least one reference copy based on one or more reference copy rules.

* * * * *